United States Patent [19]

Cerny

[11] Patent Number: 4,868,969

[45] Date of Patent: Sep. 26, 1989

[54] PROCESS FOR PRODUCING WORKPIECES

[76] Inventor: Anton Cerny, Siedlergasse 10, Vienna, Austria, A-1232

[21] Appl. No.: 111,242

[22] Filed: Oct. 21, 1987

[51] Int. Cl.[4] .................... B23P 13/00; B23B 1/00; B23B 31/12; B23C 1/14
[52] U.S. Cl. .................................. 29/558; 82/1.11; 279/1 R; 279/1 L; 409/131
[58] Field of Search .............. 29/558; 279/1 L, 1 DA, 279/1 DC, 110, 1 R; 409/219, 1, 62, 131; 82/126, 1.11; 408/1

[56] References Cited

U.S. PATENT DOCUMENTS

| 2,670,545 | 3/1954 | Kaminski | 408/1 |
| 2,940,764 | 6/1960 | Krantz | 409/219 X |

FOREIGN PATENT DOCUMENTS

| 0000427 | 3/1980 | PCT Int'l Appl. | 279/1 L |
| 475222 | 10/1975 | U.S.S.R. | 279/1 L |
| 692699 | 10/1979 | U.S.S.R. | 279/1 L |
| 810390 | 3/1981 | U.S.S.R. | 279/1 L |
| 916114 | 3/1982 | U.S.S.R. | 279/1 L |
| 1007848 | 3/1983 | U.S.S.R. | 279/1 L |
| 1202734 | 1/1986 | U.S.S.R. | 279/1 L |

Primary Examiner—William Briggs
Attorney, Agent, or Firm—Townsend and Townsend

[57] ABSTRACT

The invention relates to a process for the production of parts from profiles. According to the invention, an alignment of the profile (6) is effected by means of two diametrically opposed, synchronously self-centering jaws (2 and 3) in one plane and the alignment in a plane perpendicular to this plane is effected independently of these jaws by two further, diametrically opposed, synchronously self-centering jaws (4 and 5). A processing center according to the invention is characterized in that the jaws (2 and 3; 4 and 5) form pairs of jaws, each pair of jaws being self-centering independently of the other pair of jaws.

9 Claims, 7 Drawing Sheets

PROCESS FOR PRODUCING WORKPIECES

The invention relates to a process for the automated allround processing of workpieces or for producing parts from differently formed, bar-shaped profiles, in particular of profiles having quadrangular or rectangular cross sections, with the profiles being clamped at a distance from the end to be treated by means of four adjustable jaws and the projecting portion of the profile (the bar) as well as the cutoff workpiece being subjected to cutting treatment, such as by milling, drilling, lathe work or the like, which process is characterized according to the invention in that an alignment of the profile previously pushed between the jaws preferable having plane clamping faces through a tunnel centric to the axis of rotation in the jaw support (milling table) is effected by means of two diametrically opposed, synchronously self-centering jaws in one plane and that the alignment in a plane perpendicular to this plane is effected independently of these jaws by two further, diametrically opposed, synchronously self-centering jaws in such a manner that the intersection of the diagonals of an imaginary rectangle or square circumscribed on the profile always lies in the axis of rotation of the rotatable milling table. A processing center for cutting and for the production of workpieces from profiles of different types, in particular profile bars of rectangular or square cross-sectional shape, which preferably has at least one slideway with leaders on a basic support, on which leaders or guides at least one milling spindle is movable preferably with at least one column saddle, which center further comprises a supporting housing and a spindle head on which a milling table with four adjustable jaws is rotatably supported, is characterized according to the invention in that the jaws preferably provided with plane, optionally fluted clamping surfaces form pairs of jaws, each pair of jaws being self-centering independently of the other pair of jaws.

Advantageous embodiments of the invention are described in the following specification and claims and in the sub claims.

The invention relates to the field of detach cutting and is particularly applicable to the production of parts, mainly by milling treatment on the ends of rods or bars.

The present invention solves several problems simultaneously.

1. A part to be processed-regardless of its shape-always needs at least one, usually several surfaces for clamping, i.e. the part always has to be fixed in a certain position in order to be able to subject it to the forces generated by cutting treatment. Conventional methods, however, do not permit the working of these surfaces, as the clamping means impede such working.

2. If the disadvantage mentioned under 1 is to be avoided, the workpiece has to be placed into the processing machine with an appropriate "clamping excess". In the process according to the invention, such a clamping excess is virtually eliminated, as the work is done off the bar or rod. The saving in material gained thereby often makes it possible to do without pre-cast parts and thus to increase the flexibility and quality of processing.

3. The process is to be classified as a flexible production process, as it permits the processing of different profiles and cross-sectional shapes without retooling. The drawbacks of having to exchange a special collet chuck made for a special profile each time or having to exchange special jaws in order to be able to change over to a different cross-sectional shape are completely eliminated according to the invention.

4. To work the sixth side of a cube -even if work is done off the bar or rod-an intermediary manipulation of the part, either for turning it or for placing it in another clamping device, is always necessary. This is normally done manually or by means of handling devices (robots). This intermediary operation is completely eliminated in the process according to the invention, as the workpiece under treatment is directly clamped into another clamping device for working the sixth side before it is completely cut off.

5. The problem of discharging is generally also solved by means of handling devices. In the process according to the invention, this is not necessary because the pivotal second clamping device need only perform a further pivoting motion in order to charge a simple conveyor belt.

The invention primarily solves the problem of directly integrating bars and rods of different cross-sectional shapes into the production process.

According to the state of the art,- particularly in the case of starting materials of square cross sections, - these materials are subjected to a material handling operation normally including the cutting of bars and rods into pieces and placing the pieces into intermediary storage in some kind of containers. Palletizing with all its advantages and disadvantages is also usual, but more suitable for pre-cast parts.

The working of feed-stock directly in the processing machine is mainly usual for lathe work. To generate the cutting motion, the entire bar is normally set in rotating motion, while the cutting tools carry out the forward feed.

An occasional locking of the spindle (and thus of the workpiece) and working of surfaces, grooves and the like is also known, although these processes are restricted mainly to dynamically balanced parts.

If profiles of different cross sections, for instance hexagonal or square stock profiles or the like are processed, clamping inserts (collet chucks) precisely fitting the respective profile are required. These have to be changed in an elaborate retooling operation.

In the process according to the invention for the production of parts (by milling, drilling or the like) directly at the end of various, in particular square profile bars as the starting material, the bars are pushed through a tunnel extending centrically to the axis of rotation; they are clamped spacially of one end by means of two pairs of jaws arranged at right angles in relation to one another of which one each pair clamps self-centering independently of the other pair, the narrow jaws of the one pair being insertable between the jaws of the wide pair of jaws. The process according to the invention further provides for the projecting end of the bar (the profile) to be subjected to a complete processing, with the rod itself turned in steps or forward feed if necessary. During the working operation, workpieces protruding at greater length may be additionally supported during processing either by means of center sleeves or quills exerting axial pressure and/or a second clamping device in order to prevent vibrations.

It is further provided according to the invention that prior to the complete cutting off of the end of the bar already processed on five sides (of the cube), said second clamping device having at least two jaws grips the part in such a manner that the jaws orient themselves on the worked surfaces or abut them, regardless of whether the contact surfaces are positioned symmetrically or asymmetrically in relation to the axis of rotation.

According to the invention, the processing of the sixth and last side to be worked is preceded at least by displacement or axial removal in bar direction away from the cutting joint or, even better, an additional pivoting of the bar end (workpiece) now cut off. For the discharge of the completely processed workpiece, a further pivoting of the second clamping device is provided in order to place the part for instance onto a conveyor belt, a chute or the like.

The accompanying drawings show examples of practical embodiments of the process and the processing center according to the invention.

Figure 5:
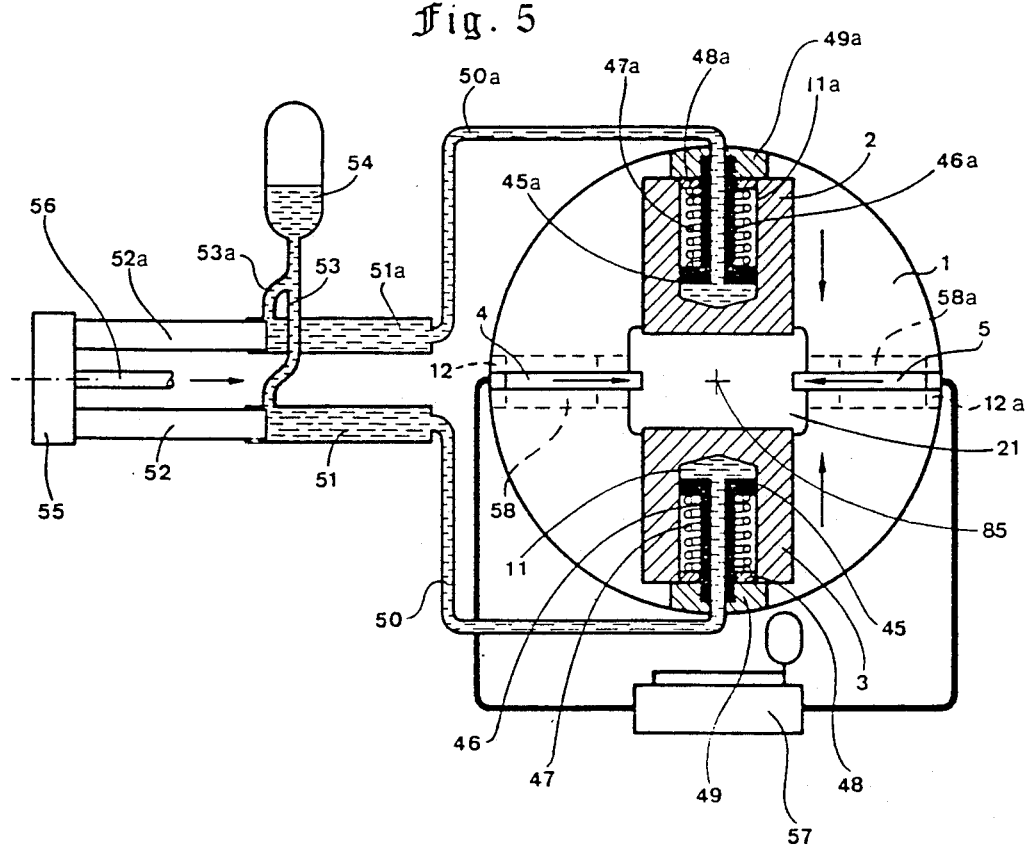
Figure 6:
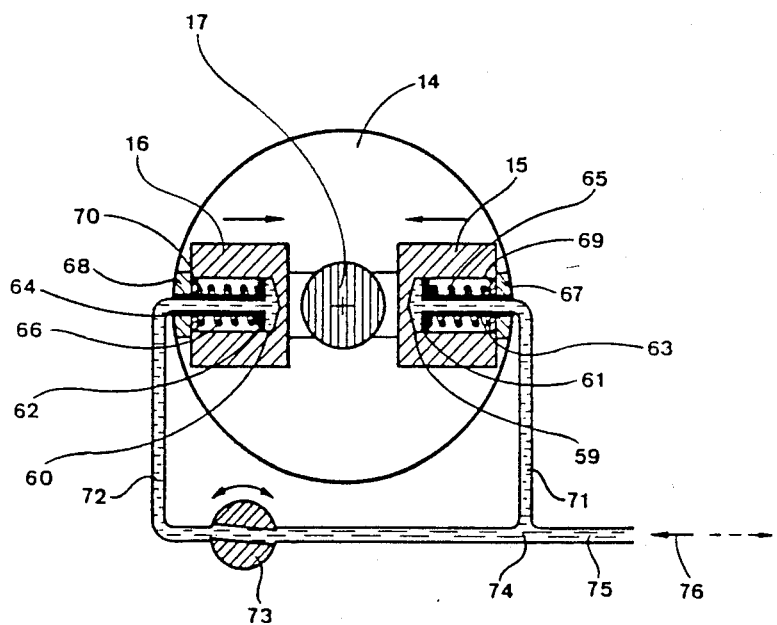
Figure 13:
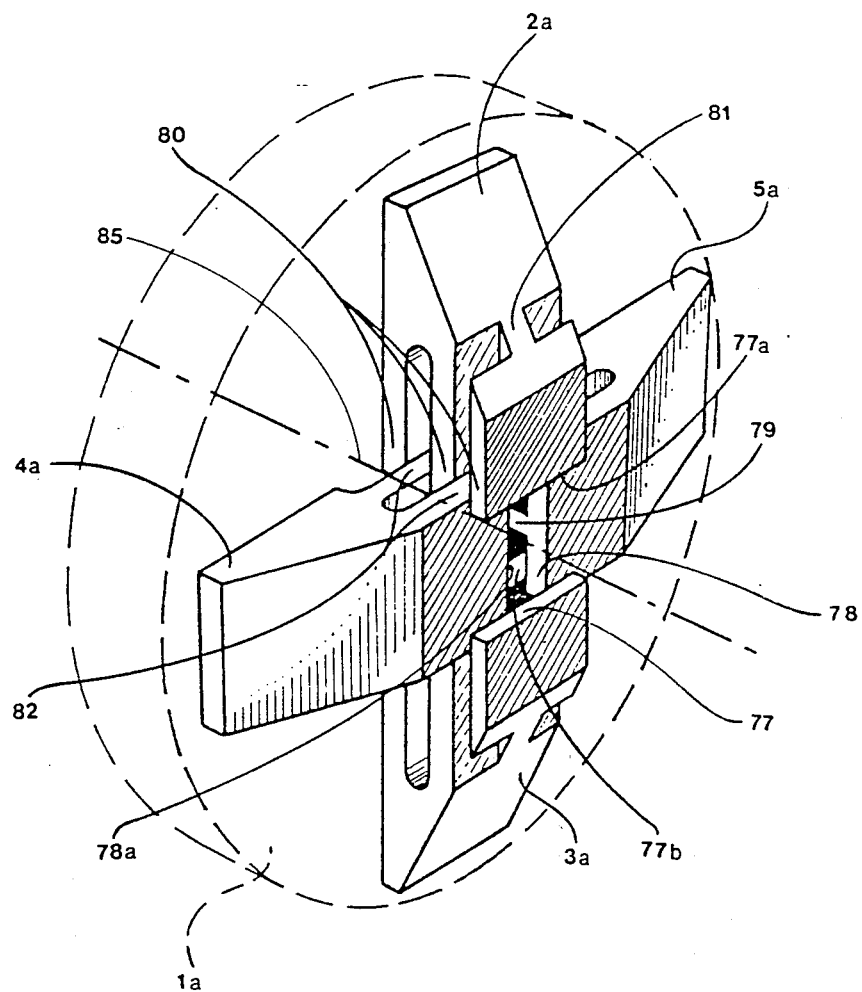

FIG. 5 partially diagrammatically shows a possible embodiment of the main clamping device;

FIG. 6 shows an embodiment of the second clamping device having self-orienting jaws;

FIGS. 7 to 12 show possibilities for the clamping and processing of profiles of different types;

FIG. 13 shows a further possible embodiment of the four jaws.

The arrows in the figures indicate the respective freedoms of motion (degrees of freedom), the black arrow points (FIG. 1) indicating the main directions and the white arrow points mainly indicating adjusting or resetting motions.

Figure 1:
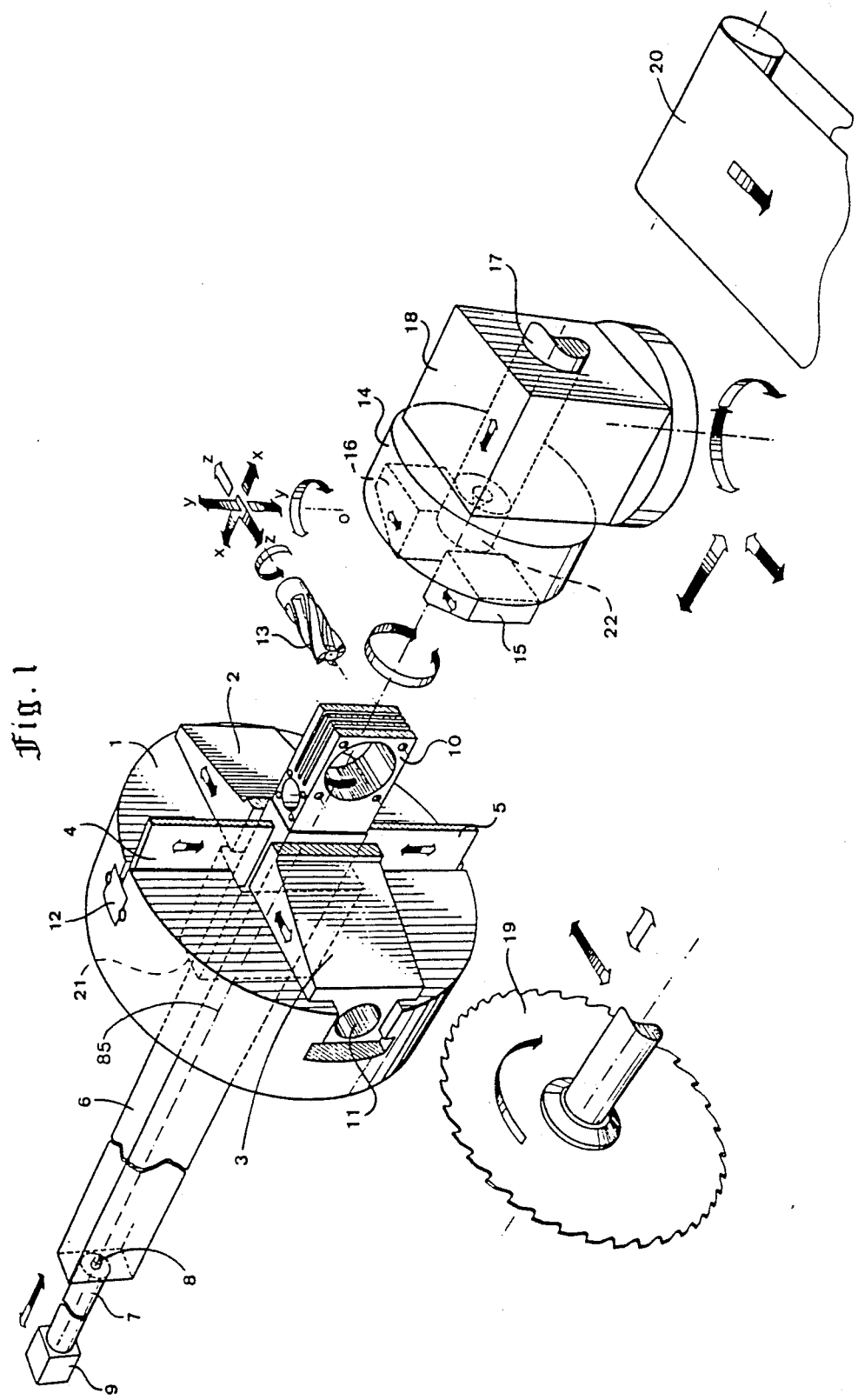
FIG. 1 shows the basic arrangement of possible or required components of a processing center and, as a processing example, a bar end worked with a gearbox of a wormgear.

The starting material 6, for instance in FIG. 1, is of rectangular cross section. The workpiece 10 worked at one end, for instance, is a gearbox for a wormgear.

This example was chosen because a part of this type can be produced in conventional processes according to the state of the art only after very comprehensive re-chucking. Moreover, in practice, clamping devices cut to the shape of the part are necessary.

The starting stock 6 (in this case a rectangular aluminum cross section) is pushed by one end through the tunnel 21 of rectangular cross section in the present case.

The wide jaws 2 and 3 are guided in the basic body 1 and are moved positively symmetrically in relation to the central axis or away from it, i.e they clamp centrically.

FIG. 5 shows an example of how an hydraulic clamping device could function.

The jaws 4 and 5 are narrow in the present case and center the workpiece on its small face. In order to be able to process or center cross sections of various forms, these jaws 4 and 5 arranged at right angles to the wide jaws 2 and 3 also clamp centrically, but independently of the wide jaws 2 and 3.

In practice, the clamping pressure of the wide jaws 2 and 3 is not increased to the required value until after the successful centering by the narrow jaws 4 and 5, so that a change of position within the wide jaws 2 and 3 can still be effected at slight abutment of the same, the material 6 being centered in the plane of the narrow jaws 4 and 5.

In the example shown, the other end of the starting stock is supported by a pin 8. Other supporting means would be conceivable, such as, for instance, slip-on couplings (for ferrous working materials also magnetic couplings) or the like. It would also be possible to weld on a supporting pin , but the placing of a small bore for the pin 8 in the front face of the other end of the bar seems to be the simplest way, all the more so since this can be carried out on the same machine: first, the other end of the profile is pushed through the tunnel into the machine and an appropriate program routine is called, the rest is carried out automatically by the machine if it is CNC-controlled.

The supporting pin 8 is conveniently formed as an expanding arbor and rotatably supported in the feeding bar 7. The feeding device 9 causes a forward feed of the starting material 6 in the case of clamping-pressure-relieved jaws 2 to 5.

Figure 2:
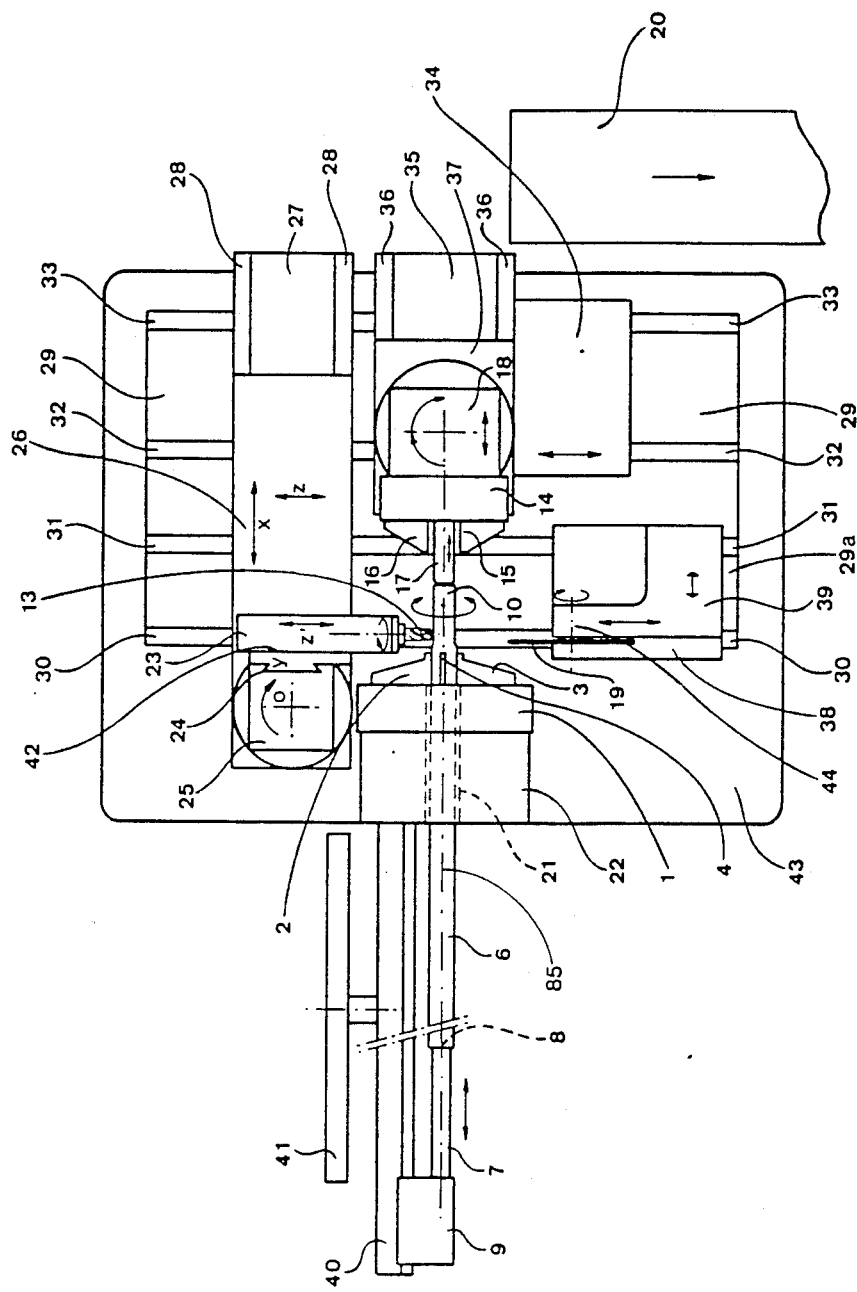
FIGS. 2 to 4 show in plan view the possible structure of a machine carrying out the process according to the invention, these figures being intended as an explanation of the individual steps of the process in the form of phase representations.

The processing of tee bar end 10 will mainly be milling. The tool 13 shown in FIGS. 1 and 2 is a milling cutter, in FIGS. 3 and 4, it is a boring cutter.

The tools are automatically exchangeable and can be directly taken up from and put back into a storage wheel 41.

It is also possible to carry out lathe work. It is even possible to produce spur wheels and worm wheels by means of plain milling cutter. For this purpose, a plain milling cutter is used as the tool 13 and supporting bodies 1 for the jaws 2 to 5 or the profile 6 are set in revolutions of gear ratio synchronous in relation to the plain milling cutter 13, the cutting motion and feeding motion being carried out by the tool 13 as usual. For this reason, the tool 13 has degrees of freedom in all three main axes X, Y, Z. Moreover, it is pivotal around an axis O and is provided—so as to be able to carry out drilling at any given angle—with an addition degree of freedom or displacing possibility Z' along the axis of the milling spindle.

If working on all five sides is completed, the spindle head 18 with the second clamping device 14 with the jaws 15 and 16 moves to the gripping range of the semi-finished workpiece 10. The jaws 15 and 16 abut the partially processed workpiece 10 successively or simultaneously. It is not necessary that the clamping faces on the work piece have the same distance to the axis of symmetry (axis of rotation)—asymmetrical faces are also suitable as clamping faces because the jaws 15 and 16 find their clamping position themselves, i.e. they orient themselves on the workpiece.

The functional diagram of FIG. 6 shows how such as device can be realized for instance hydraulically.

On the supporting body 14, the jaws 15 and 16 (for instance in T-grooves) are arranged displaceably to and from the center. Each jaw has its own actuating cylinder 59 and 60. The respective associated piston 61 and 62 is attached via abutments 67 and 68 on the respective piston rods 63 and 64 to the basic body 14.

The piston rods are of hollow (tubular) shape; coaxially around the piston rods 63 and 64, pressure springs 65 and 66 for returning the jaws 15 and 16 at pressure relief are provided and act on the jaws via back-up rings 69 and 70 on the side facing away from the center.

If pressure is applied in arrow direction 76, the pressure propagates via a pipeline 75 and a bifurcation 74 to the cylinders via the pipelines or channels 71 and 72 and a valve 73.

Both jaws (aside from differing friction conditions) now start to move in the direction of the center of the body 14 because the volume of the cylinders 59 and 60 is expanded (filled). The jaw first abutting a clamping face stops, while the other jaw keeps moving towards the center until it comes into contact with an obstacle. If the pressure has reached its maximum value required for gripping power, the valve 73 is locked whereby undesirable "floating motions" of the jaws are retroactively prevented.

Figure 4:
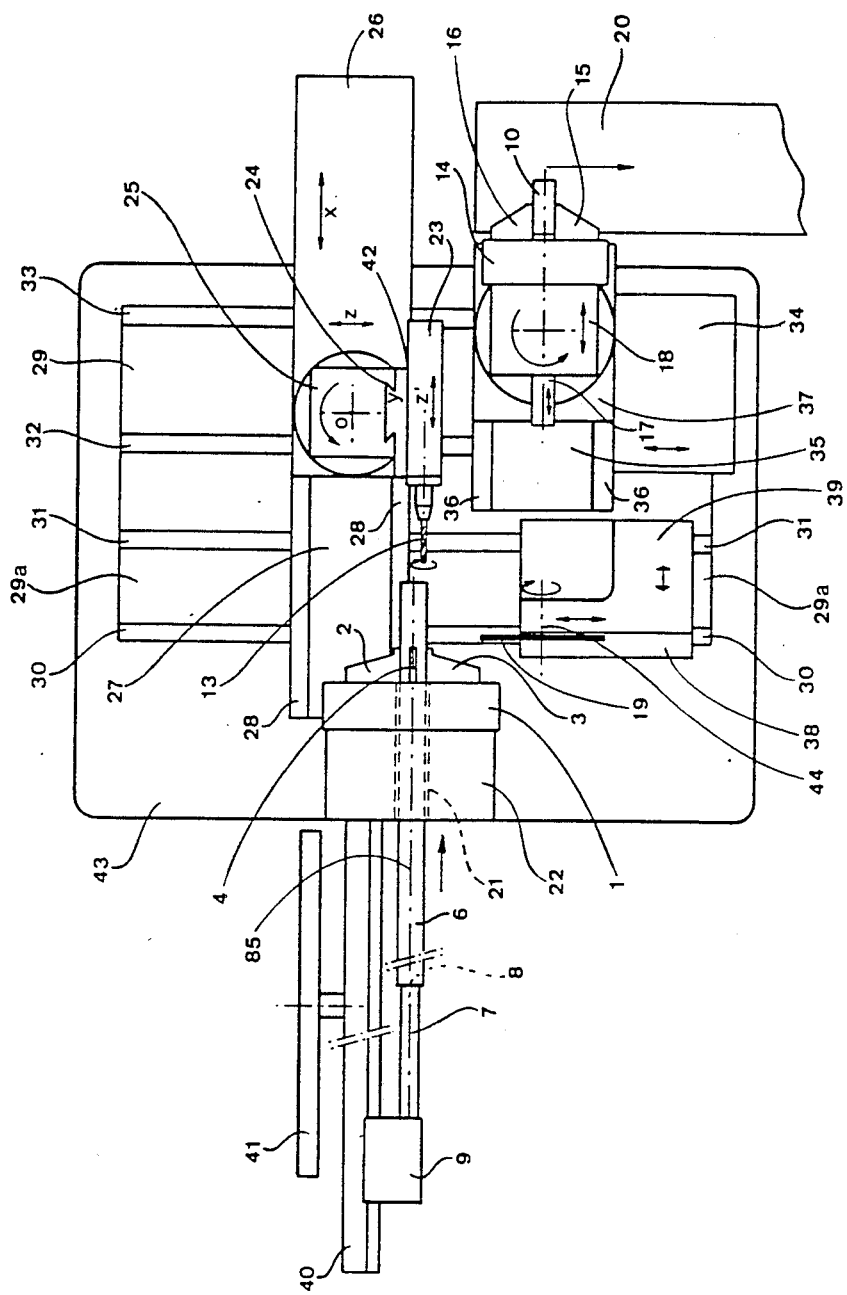

The center sleeve 17 is retracted into the supporting body 14; it normally serves as a support for workpieces which protrude at some length, so that they can no longer be worked "flying". (FIG. 2). The center sleeve 17 can also be used as an ejector, for instance in placing the workpiece onto a belt 20 (FIG. 4).

In order to prevent oscillations generated during the working of workpieces projecting far out, an additional axial clamping pressure may be exerted on the front face of the workpiece (the projecting end of the profile). For this purpose, the tailstock 17 may be provided on its front face with various false jaws such as fluted plates, lathe centers (FIG. 1) or the like.

This also applies to all the jaws which may be fluted in order to increase the friction. The jaws 15 and 16 of the second clamping device 14 may be provided with a prismatic false jaw if, for instance, cylindrical pins have to be clamped.

Added to the pair of jaws 15 and 16 may be a further pair positioned at right angles thereto and also self-orienting according to FIG. 6.

If the end 10 under work is clamped into the further clamping device 14, the separating or cut-off device can be activated. The cut-off device, for instance, is represented as a circular saw 19, although other cut-off devices such as band saws, compass saws, saber saws, hacksaws and other types of separating means including laser cutting devices are also conceivable.

The separating devices need not reach cutting depths beyond the center because the workpiece 10 and 6 can be turned during separation.

A cutting-off (slicing)operation seems more difficult, as the entire profile 6 would have to be rotated faster together with the bulky clamping device. Moreover, cut-off operations are hardly possible, for instance in the case of flat profiles, due to oscillations generated by the interrupted cut.

Once the workpiece 10 is severed from the starting material 6, the spindle head 18 can be set back and pivoted by 90 degrees at the same time. In some cases, it would suffice to merely move the workpiece axially out of the cutting joint, as the processing of the reverse side of the cutting joint could start here.

An additional pivoting motion by 90 degrees and resetting of the spindle head 18 at right angles to the axis of rotation of the milling table 1 along the guides 32 and 33 is to be given preference, however, as this improves the accessibility this the process ability of the reverse side of the cutting surface. For this purpose, the spindle head 18 is arranged rotatably on a compound (slide) rest.

The compound rest comprises a bottom part 34 which rests as a slide on guides 32 and 33 of a bed part 29. Perpendicular to these guides, a transverse bed 35 is fixed to the bottom part 34. The transverse bed 35 carried guides 36 on which slides 37 glide.

Figure 3:
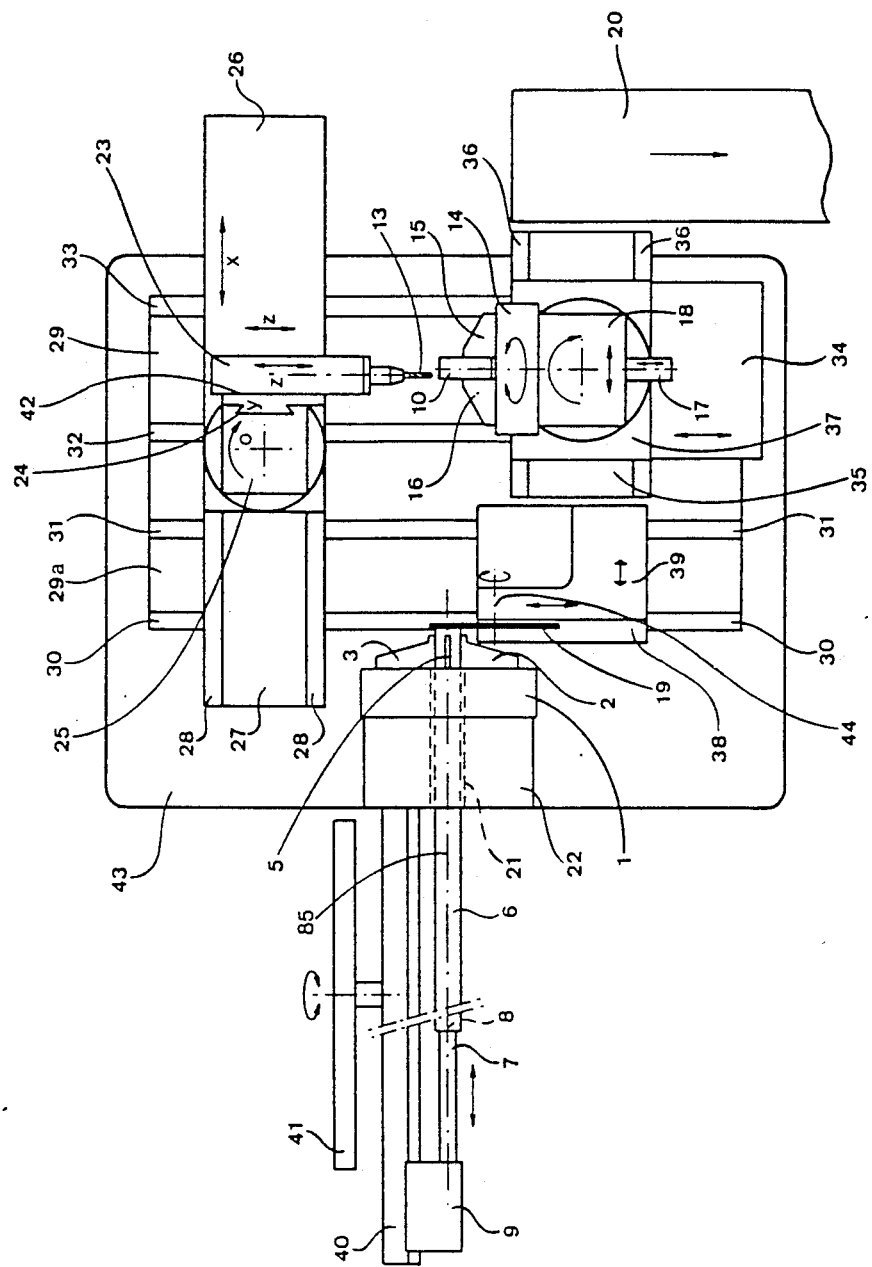

According to FIG. 3, the slide 34 reaches far enough back in its outermost position (downwards in FIG. 3).

By the pivoting motion by 90 degrees of the spindle head 18, the sixth side is now easily accessible for working.

The sixth side can also be lathe-worked. The clamping device 14 will normally be of smaller dimensions than the milling table 1—also, it is no longer a whole profile bar that needs to be set into fast rotation.

Aside from cases with excentrically worked surfaces, the workpiece 10 will be in a centered position in relation to the axis of rotation of the clamping device and will thus hardly generate interfering unbalance forces, which seems to allow a cutting speed sufficient for lathe work.

In most cases, however, milling and drilling work will be done with locked clamping device 14.

Once this treatment is completed, the spindle head 18 can be pivoted by further 90 degrees (FIG. 4) and the finished workpiece can be placed, for instance on the belt 20, by simple opening of the jaws 15 and 16.

It should be mentioned that the discharge could take a different course, for instance, it could be effected by means of a manipulating device in the position shown in FIG. 3. It could also be done manually or by placing the workpieces on a chute.

FIG. 4 shows the material forward feed device 9 in action and the starting material 6 advanced by the length of a workpiece (10) plus machining allowance and cutting width. It is to be noted that in the case of workpieces projecting far out, the front face, for instance, can be worked in a multistage operation after cutting off and prior to advancing the starting material 6. In this case, however, the exterior quality of the material (straightness or surface of the bar) of the starting material 6 and the precision required in the manufacture of the workpiece are of importance, as bending, for instance, has a direct effect on the precision of the part to be manufactured. Centric changes of position of the part under work after the advance of the bar and renewed clamping in a different spot are possible.

The material advance device 9 is guided on a guide 40 and extending parallel to the axis of rotation. If the forward feed of the bars 6 is not to be limited by a stop, it is recommendable to provide this device with a controlled drive. The feed bar will be provided long enough to assure an adequately deep penetration into the tunnel 21 in order to keep the cuttings unfit for further processing to a minimum.

The further construction of a machine for carrying out the process is explained in the following under reference to the accompanying drawings.

It is convenient to provide an appropriately stable base frame, base plate or base support 43 (FIGS. 2 to 4). Placed on this base support 43 are a double slide way 29 and 29a and the spindle head 22. The spindle head 22 can be displaceable for adjusting purposes The spindle head 22 can support the chuck body or milling table 1 either via a live ring or the body 1 can be fastened to a spindle which is then normally supported in at least two places. The spindle must then contain an extension of the tunnel 21, however. The spindle must also be provided with a gear, worm gear or other drive means. Care must be taken to have power transmission without play if the work is to be done not only with step-wise locking.

The rotatable milling table 1 (also chuck body or clamping device body 1) is conveniently provided with crossed T-grooves. If the clamping device is an hydraulic one (according to FIG. 5), the cylinder bores 11 and 11a (also visible in FIG. 1) can be provided in the widened web of the double-T-shaped jaws in the case of the wide jaws 2 and 3. The provision of an adequately large hydraulic cylinder is possible in the case of the narrow jaws as well. The flange of the jaws 4 and 5 can be widened, for instance, so as to form a cylinder 58 and 58a of square outer contour.

The piston rods are then fastened by means of the abutments 12 and 12a which have the form of elbows (bends) and are inserted into the T-shaped groove. The embodiment as a bend or elbow of cuboid outer contour offers the advantage that the hydraulic lines can be made to extend within the cylindrical outer shape of the chuck body 1. The wide jaws 2 and 3 are of course also provided with abutments 49 and 49a which were omitted in FIG. 1 for reasons of clarity.

Via these abutments 49 and 49a, the ends of the piston rods 46 and 46a are fixed to the milling table 1 or chuck body. The piston rods are of tubular shape and are provided on their other ends with pistons 45 and 45a sealing off the cylinder space.

The cylinders 11 and 11a are single-acting (as in FIG. 6) because the workpieces (6 and 10) are virtually always clamped from the outside.

Resetting of the jaws is effected by means of coil springs 47 and 47a which as pressure springs are supported unilaterally on the pistons 45 and 45a and initiate the resetting motion of the jaws 2 and 3 via back-up rings 48 and 48a firmly attached to them.

In order to achieve the synchronization of two diametrically opposed jaws, identical amounts of fluid have to be forced into both of the cylinders 11 and 11a simultaneously each time. This can be achieved, for instance, by (FIG. 5) connecting two plunger pistons 52 and 52a by means of a yoke 55 so that they can only move simultaneously.

The plunger pistons 52 and 52a are represented in their outermost retracted position—the jaws 2 and 3 are open widest. If the tie rod 56 is set into motion according to the direction of the arrow, the pistons 52 and 52a first close the openings of the two channels 53, 53a leading to the storage tank 54 simultaneously in the manner of a sliding valve. Any further motion of the two pistons 52 and 52a now results in a simultaneous motion of the jaws 2 and 3—according to the piston surface ratio in the direction of the center. The storage container 54 used is conveniently a membrane container as this prevents atmospheric contact with the liquid medium. This is particular useful because the synchronization means is conveniently connected to the milling table 1 (for instance on its rear side) and is thus entrained in rotation. Tractive power can be imparted to the tie rod 56 by means of any given actuation—a actuator will be useful for a defined opening of the jaws.

The jaws could of course also be synchronized by means of conventional hydraulic synchronization control valves.

FIG. 5 shows only one of a number of possible solutions. Mechanical actuation of the jaws is also possible, although the secure clamping of whole bars requires very high clamping forces which are best achieved hydraulically.

It should also be considered that the respective opposing jaws (2 and 3 as well as 4 and 5) must have independent self-centering function, so that continuous threaded spindles actuating or displacing both jaws simultaneously, which would best suited for generating clamping power, are not as well suited as the solution according to the invention due to the central tunnel. The independence of the respective pairs of jaws also excludes conventional plane spiral drives. Moreover, these would be subjected to rapid wear due to the high Hertzian stress.

The transfer of hydraulic energy flow to the rotating milling table will normally be possible by means of known per se multiple passages; ring wheels could also transmit electric energy or signals. Since the operation of clamping and vice versa releasing is normally not carried out during the rotating motion, but instead while the milling table 1 is stationary, it is conceivable to transfer energy flows of any kind (mechanical, hydraulic, electric) in this stationary phase by coupling in order to move the jaws and then, for instance, lock them in the respective position. This also applies to a transmission of sensor or position measuring (localization) signals. For the purpose of maximum synchronicity precision, it would be conceivable to monitor the synchronization of the jaws by means of path measuring systems.

Moreover, the fact that activities are only carried out during the stationary phase of the milling table causes that the synchronization means for the counter parallel movements of the jaws are not positively entrained in rotation, but can be coupled during this stationary phase and released before rotation sets in.

The work spindle 23 receiving the tool 13 is additionally axially displaceable on leaders 42. This axis bears the reference symbol Z'.

On the other bedside on the same leaders on which the column saddle 27 is supported, but only on the leaders 30 and 31, a further column saddle 38 is supported; it is transversely displaceable in relation to the leaders 30 and 31 and carries a circular saw device 39 with a saw disk 19.

The bearing 44 of the saw disk 19 is conveniently as short as possible because work has to be done between the two clamping devices 1 and 14. The saw disk 19 need only penetrate as far as the center of rotation because the workpiece can be turned.

The column saddle 34 is supported on the other half of the bed 29 on the leaders 32 and 33. These parts have been described in the description of function.

Figure 7:
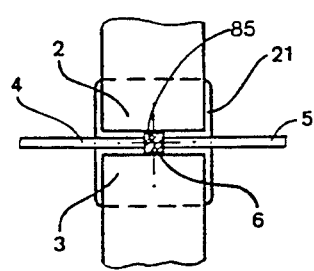

FIG. 7 shows how a small square cross section 6 is clamped.

The narrow jaws 4 and 5 are deeply insertable into the area of the wide jaws 2 and 3. The minimum height of the profile 6 is determined by the width of the pair of narrow jaws 4 and 5.

Figure 8:
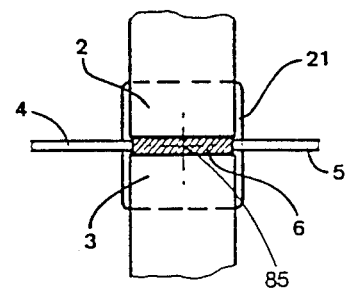

FIG. 8 shows the independence of the respective centrically clamping pairs of jaws. The wide jaws 2 and 3 are removed by a small distance from the center, while the narrow jaws 4 and 5 have already reached their maximum opening.

Figure 9:
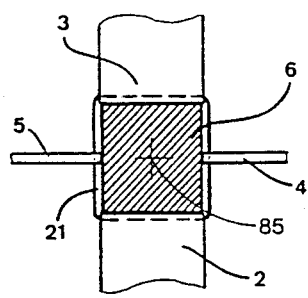

FIG. 9 shows a large square profile 6; the two pairs of jaws are at the same distance from the center 85.

Figure 10:
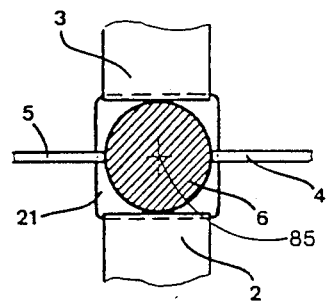

FIG. 10 shows a cylindrical cross section 6; due to the symmetry of rotation, both pairs of jaws are again at the same distance from the center 85.

Figure 11:
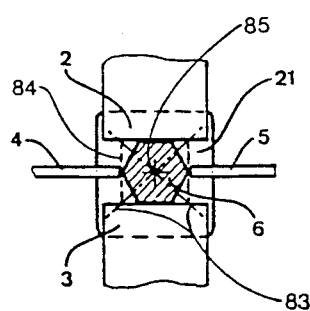

FIG. 11 shows how a hexagonal profile is clamped. The pairs of jaws are at different distances from the center.

Figure 12:
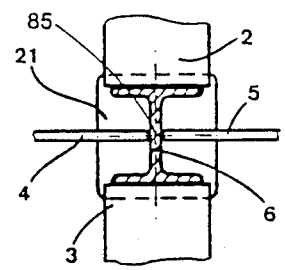

FIG. 12 shows the manifold possibilities of the use of the process according to the invention and the device according to the invention. A wide-flanged steel, for instance, can be subjected to front face work, punching and cutting off by means of a machine applying the process according to the invention.

The independent centric alignment permits the clamping and processing of any given profile.

In each case, the alignment of in particular symmetrical profiles will be carried out in such a manner that the intersection 85 of the diagonals of a rectangle or quadrangle circumscribed on the profile will always be positioned in the axis of rotation of the rotatable milling table 1. FIG. 11 shows a hexagonal profile 6 with an imaginary rectangle 84 circumscribed around it. The intersection of the diagonals 83 of said rectangle 84 is located according to the invention in the center 85 (or the axis of rotation 85) of the milling table 1.

By the same token, the position of all other, in particular symmetrical profiles can be defined by means of imaginary rectangles or squares—the intersection of the diagonals formed is in the center 85 of the milling table 1.

At the same time, high flexibility of production is achieved because programs of recurring parts can be stored as a result of the CNC control engineering.

Only the starting material 6 needed for the workpiece to be produced is to be placed into the machine; if necessary, tools 13 are to be added to the storage wheel 41.

No pallets whatsoever have to be produced; this also eliminates assembling work.

The material flow is also simplified. On principle, the jaws 2,3 and 4,5 could also be of the same width.

FIG. 13 shows a further embodiment of the clamping jaws.

The pairs of jaws are located in different planes in relation to one another and thus permit a laminar engagement or meshing. The advantage of this arrangement resides mainly in that planar profiles can be clamped not only over their entire width, but also over their entire height.

Moreover, a restriction of the smallest profiles to be processed by narrow jaws inserted between wide jaws no longer exists if the supporting webs 79,81 are moved back (or completely omitted) so far that a closing of both pairs of jaws to zero, i.e. in the axis of rotation, is possible The pairs of jaws in FIG. 13 bear the same reference numbers as those of FIG. 1, but with an added a. The jaws 2a and 3a correspond to the pair of wide jaws 2 and 3 in FIG. 1 and the jaws 4a and 5a have the same function as the narrow jaws 4 and 5 in FIG. 1.

While the jaws 2a and 3a each have three lamellas 80 with three each rectangular clamping faces of which only the clamping, faces 77, 77a and 77b are visible, the jaws 4a and 5a each have two lamellas or clamping jaw parts with clamping faces 82.

Since the webs 79 of the same (here in the drawing) are not set back, the faces 78 and 78a are of H-like shape. The webs 79 would thus have the same restricting effect as the narrow jaws 4 and 5 in FIG. 1. The webs 79 can be omitted, however, so that they do not impede an approach of the faces 77,77a.

The number of lamellas 80, 82 is not predetermined or limited.

Theoretically, one each lamella per jaw would be sufficient. In practice, however, the clamping length along the length of the profile will be selected as a maximum in order to assure a clean alignment of the clamped profile in relation to the axis of rotation, so that a larger number of lamellas is provided In order to reach a clean abutment, in particular of wide jaws to slightly unparallel profiles, it is possible to make only one clamping face of a jaw of a wide pair of jaws cleanly plane, while the opposing face is slightly cambered.

This would no doubt compensate for minor deviations of parallelism in the profiles, but at the expense of the clamping pressure of this cambered jaw which then usually acts only in the center so that the projecting portion of the profile becomes susceptible to vibrations.

The wide jaws are conveniently plane and made moderately flexible by an appropriate lateral play in at least one each jaw guide of a pair of jaws.

It is even more convenient to provide the web and/or the flange guiding the jaw in the T-shaped groove not with parallel faces, but instead with slightly cambered faces tapering on the ends in the form of a shuttle. The minor changes of position of the cylinder integrated into the jaw are normally bridged or compensated by the elastic sets of seals.

In this was, a secure clamping over the entire width of the profile is assured.

The milling table 1a or chuck body is only sketched, it naturally also has a central tunnel. It should be noted that the tunnel may have any given shape in all embodiments.

The tunnel may be of circular or of oval shape, although a rectangular or square shape will be preferred, as this is mainly the form of the profiles to be processed and facilitates the guiding of these profiles to the jaws.

A mechanical or electromechanical actuation of the jaws could be achieved, similar to the hydraulic version, by coupling the synchronization and driving devices of the jaws only when the milling table is stationary, for instance by means of couplings, gears or pressure plates, traction slides or pressure slides which in each case are engaged in a certain position for the simultaneous, synchronous actuation of the jaws. The couplings could e.g. be shaft couplings connected torsion-proof to four spindles to which individual jaws are associated. If the spindles are of even-sided direction of spiral, the coupled synchronous drives per pair must have an opposite rotating direction or opposite rotating sense. Spindles of opposing direction of spiral (left- and right-sided) have the same rotating sense and rotating direction. Continuous spindles located at different levels each actuating a pair of jaws by means of left-handed thread and right-handed thread must be arranged laterally outside of the tunnel area this would cause an eccentric action of force on the jaws and resulting tilting forces on the jaw guides. This could be remedied by spindles connected in pairs via spur wheels generating action of force on both sides of the jaws and thus releasing the tunnel for its purpose. Lateral synchronous shafts evading the tunnel connected to the spindles via gears would also be possible—these would also have to be arranged at different levels for each pair of jaws because they cross each other. The foregoing are only suggestions for the possibilities of the mechanical or electromotive (electromechanical) actuation of the jaws.

The figures show an exemplary embodiment with horizontal main axis 85, although the process could also be realized by means of a vertical axis of rotation 85. In this case, bar material would have to be supplied to the tunnel 21 from below. Supporting of the profile ends would be simpler, but a plant of this type could only process short pieces or short lengths of profile unless it extends over several floors.

The position of the work spindle 23 and the leaders and guides in the exemplary embodiments is not compelling. It would also be possible to provide inclined bed slideways or vertical slideways. The exemplary embodiments were selected because of the advantage of favorable chip clearance at horizontal drilling and milling work.

I claim:

1. A process for producing parts from differently formed, bar-shaped profiles comprising the steps of: clamping a profile at a distance from an end to be treated by means of four adjustable jaws so that a portion of the profile from which a part is to be produced projects past the jaws, the jaw being movably mounted to a rotatable jaw support having a tunnel which is coaxial with the axis of rotation of the jaw support; axially advancing the profile past the jaws through the tunnel; aligning the bar with the axis of rotation by synchronously moving two diametrically opposed, self-centering jaws in one plane and, independently thereof, synchronously moving two further, diametrically opposed self-centering jaws in a second, substantially perpendicular plane into engagement with the bar in such a manner that the intersection of the diagonals of an imaginary rectangle or square circumscribed on a cross-section of the profile is in substantial alignment with the axis of rotation of the jaw support; one set of opposed jaws having a width perpendicular to the axis of the profile which is at least as large as the greatest width of the profile and the other set of opposed jaws having a width perpendicular to the axis of the profile which is substantially less than the width of the one set of opposed jaws so that the other set of jaws can be disposed between the one set of jaws.

2. The process according to claim 1 including the step of severing the projecting profile portion from the remaining profile by means of a separating device which provides the cutting energy itself.

3. A process for producing parts from differently formed, bar-shaped profiles comprising the steps of: clamping a profile at a distance from an end to be treated by means of four adjustable jaws so that a portion of the profile from which a part is to be produced projects past the jaws, the jaw being movably mounted to a rotatable jaw support having a tunnel which is coaxial with the axis of rotation of the jaw support; axailly advancing the profile past the jaws through the tunnel; aligning the bar with the axis of rotation by synchronously moving two diametrically opposed, self-centering jaws in one plane and, independently thereof, synchronously moving two further, diametrically opposed self-centering jaws on a second, substantially perpendicular plane into engagement with the bar in such a manner that the intersection of the diagonals of an imaginary rectangle or square circumscribed on a cross-section of the profile is in substantial alignment with the axis of rotation of the jaw support; forming a supporting bore in an end of the profile facing away from the projecting portion of the profile supporting said end of the profile by extending an expanding arbor into the supporting bore; and longitudinally advancing the profile towards the jaw support with the arbor.

4. A process for producing parts from differently formed, bar-shaped profiles comprising the steps of: clamping a profile at a distance from an end to be treated by means of four adjustable jaws so that a portion of the profile from which a part is to be produced projects past the jaws, the jaw being movably mounted to a rotatable jaw support having a tunnel which is coaxial with the axis of rotation of the jaw support; axially advancing the profile past the jaws through the tunnel; aligning the bar with the axis of rotation by synchronously moving two diametrically opposed, self-centering jaws in one plane and, independently thereof, synchronously moving two further, diametrically opposed self-centering jaws in a second, substantial perpendicular plane into engagement with the bar in such a manner that the intersection of the diagonals of an imaginary rectangle or square circumscribed on a cross-section of the profile is in substantial alignment with the axis of rotation of the jaw support; thereafter gripping the projecting portion of the profile on at least two untreated or already treated faces with jaws of a clamping device located opposite to the jaw support positioning the jaws of the clamping device on said faces so that the projecting portion remains in the position defined by the jaws on the jaw support in relation to the axis of rotation of the jaw support while it is clamped.

5. A process for producing parts from differently formed, bar-shaped profiles comprising the steps of: clamping a profile at a distance from an end to be treated by means of four adjustable jaws so that a portion of the profile from which a part is to be produced projects past the jaws, the jaw being movably mounted to a rotatable jaw support having a tunnel which is coaxial with the axis of rotation of the jaw support; axially advancing the profile past the jaws through the tunnel; aligning the bar with the axis of rotation by synchronously moving two diametrically opposed, self-centering jaws in one plane and, independently thereof, synchronously moving two further, diametrically opposed self-centering jaws on a second, substantially perpendicular plane into engagement with the bar in such a manner that the intersection of the diagonals of an imaginary rectangle or square circumscribed on a cross-section of the profile is in substantial alignment with the axis of rotation of the jaw support; holding the projecting portion of the profile with a clamping device arranged opposite the jaw support and aligned therewith; severing the part from the projecting portion of the profile; and thereafter subjecting the part while held by the clamping device to rotating motions.

6. The process according to claim 5, including moving the cut-off part held by the clamping device at least axially away from a remainder of the profile by means of the clamping device for processing of the part including a side of the part which was formed when the part was severed from the profile.

7. The process according to claim 5, including, for better accessibility of a surface of the part formed when severing it from the profile the step of rotating the part with the clamping device through at least about 90 degrees.

8. The process according to claim 3, wherein for forming the supporting bore, said end of the profile is pushed prior to processing through the tunnel between the jaws into the jaw support so that said end projects past the jaws, and wherein the step of forming the supporting bore is made by drilling into said projecting end coaxially with the axis of rotation of the jaw support.

9. A process for producing gearwheels, worn wheels and endless screws directly from bar-shaped profiles, comprising the steps of: clamping a profile at a distance from an end to be treated by means of four adjustable jaws so that a portion of the profile from which a part is to be produced projects past the jaws, the jaw being movably mounted to a rotatable jaw support having a tunnel which is coaxial with the axis of rotation of the jaw support; axially advancing the profile past the jaws through the tunnel; aligning the bar with the axis of rotation by synchronously moving two diametrically opposed, self-centering jaws in one plane and, independently thereof, synchronously moving two further, diametrically opposed self-centering jaws in a second, substantially perpendicular plane into engagement with the bar in such a manner that the intersection of the diagonals of an imaginary rectangle or square circumscribed on a cross-section of the profile is in substantial alignment with the axis of rotation of the jaw support; rotating a milling spindle in contact with the projecting portion of the profile; and moving the rotating spindle forward in an axial direction in synchronism with the rotating profile at a rate depending on the number of starts or the diametrical pitch of the wheels or screws.

* * * * *